No. 756,332. PATENTED APR. 5, 1904.
F. M. CONROY.
FARM GATE.
APPLICATION FILED NOV. 2, 1903.
NO MODEL. 2 SHEETS—SHEET 1.
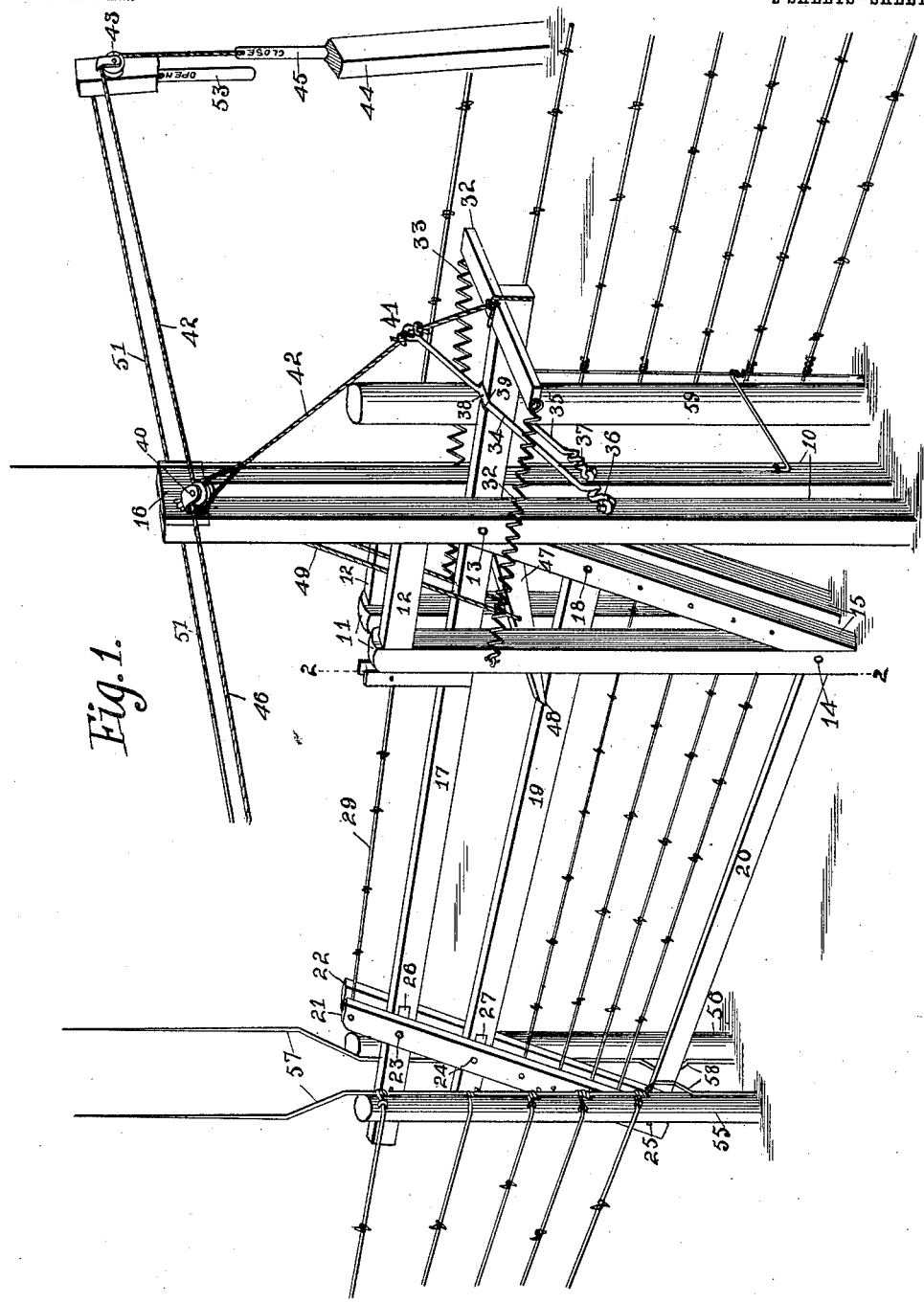
Witnesses
C. D. Hague.
S. F. Christy.
Inventor F. M. Conroy
By Orwig & Lane Att'ys.

No. 756,332. PATENTED APR. 5, 1904.
F. M. CONROY.
FARM GATE.
APPLICATION FILED NOV. 2, 1903.
NO MODEL. 2 SHEETS—SHEET 2.
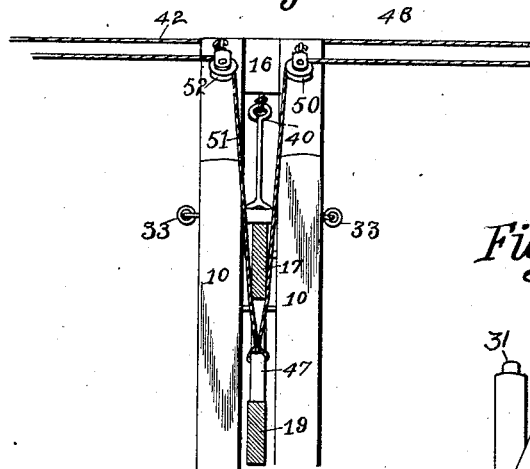
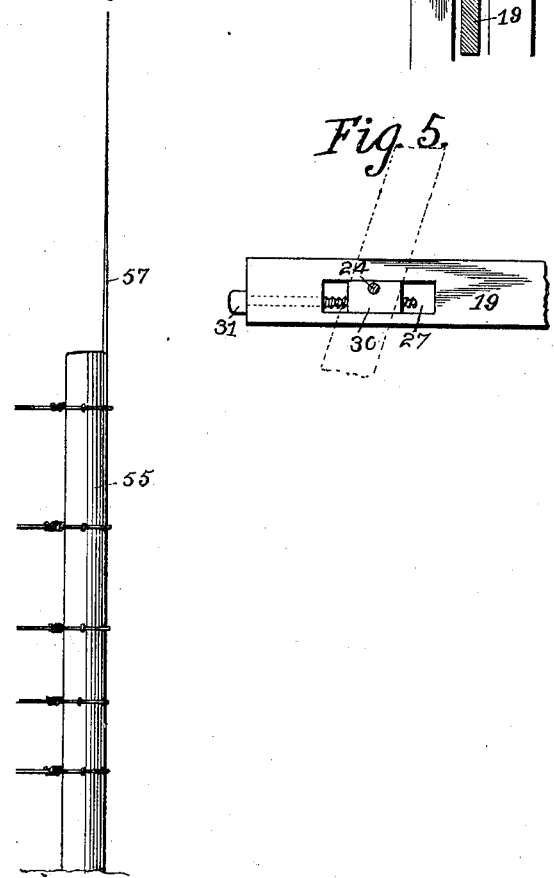
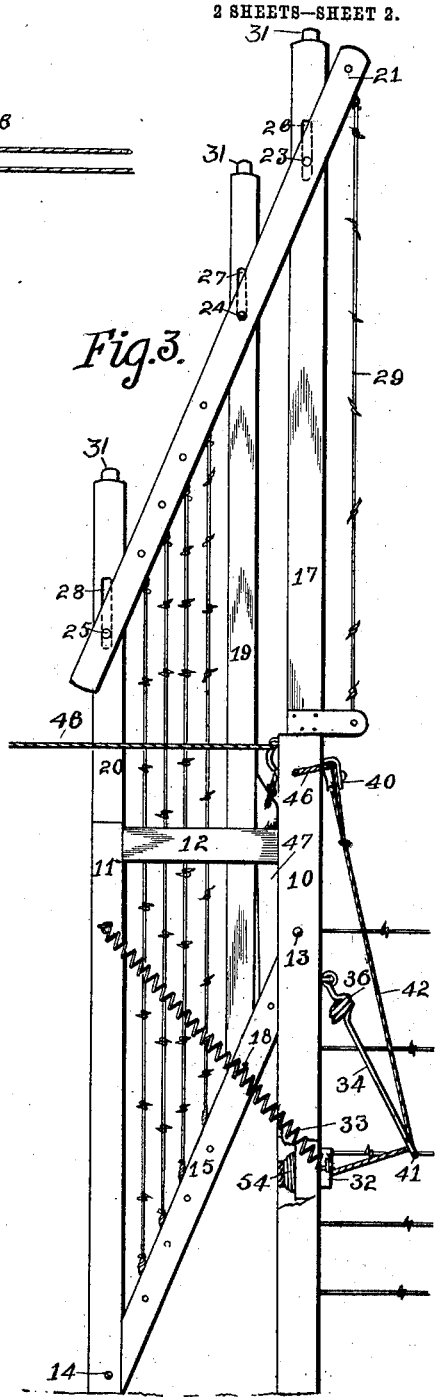
Witnesses
A. G. Hague
S. F. Christy
Inventor F. M. Conroy,
By Quirig & Lane Attys.

No. 756,332. Patented April 5, 1904.

UNITED STATES PATENT OFFICE.

FRANK M. CONROY, OF FONDA, IOWA.

FARM-GATE.

SPECIFICATION forming part of Letters Patent No. 756,332, dated April 5, 1904.

Application filed November 2, 1903. Serial No. 179,496. (No model.)

*To all whom it may concern:*

Be it known that I, FRANK M. CONROY, a citizen of the United States, residing at Fonda, in the county of Pocahontas and State of Iowa, have invented certain new and useful Improvements in Farm-Gates, of which the following is a specification.

The objects of my invention are to provide a swinging gate of simple and durable construction, which will be comparatively inexpensive to manufacture and which can be easily and readily operated by any person desiring to pass through the gateway without getting out of the vehicle in which he is as he approaches the gate, and, further, to enable the person passing through the gateway to close the gate after he has passed through the gateway without getting down from the vehicle in which he is.

A further object is to provide a gate which will easily swing to an open position by pulling a single rope and will be maintained in that position until a second rope is pulled to cause the gate to move to a closed position.

A further and very material object is to provide a gate which will swing upwardly as it opens, and thus be easily operated when the ground-surface is covered with snow, and which will be swung to an open position very quickly, owing to my arrangement of springs, and yet the jar of the gate, which is drawn to an open position, will be reduced to a minimum on account of the construction of my device and the gate when moved to a closed position will not strike the ground with full force, owing to the springing device which I have provided for breaking the force of the fall, and thus prevent the straining and racking of the gate to a very large extent.

A further object is to provide rods adjacent to the gate which serve the purpose of guiding the gate into a closed position and to assist in retaining it in a closed position and also serve the purpose of a conductor of electricity.

A further object is to provide a device for absolutely locking the gate in a closed position and means for keeping the wires forming a portion of the gate taut.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows in perspective the complete gate, except that one part of the ropes for raising and lowering the gate is broken away. Fig. 2 is a sectional view of the upper portion of the gate cut on the line 2 2 of Fig. 1. Fig. 3 is a side elevation of the gate in a raised position. Fig. 4 is a side elevation of the post against which the gate shown in Fig. 3 rests in a closed position; and Fig. 5 is a detail view of one of the bars of the gate, showing the means for adjusting the cross-pieces in the gate for tightening the wires in the gate.

Referring to the accompanying drawings, I have used the reference-numeral 10 to indicate the posts at the rear of the gate.

The reference-numeral 11 indicates the posts immediately in front of the posts 10 and attached to them by means of the connecting-pieces 12.

Extending diagonally between the posts 10 and 11 on each side of the gate is a brace 15. The posts 10 are set a slight distance apart and are substantially parallel with each other. The posts 11 are substantially the same distance apart as the posts 10 and are parallel with each other and with said posts 10. The braces 15 are the same distance apart as the posts 10. Connecting the top portion of the posts 10 is a block 16, designed to engage the upper rail of the gate and to positively check its movement as the gate is opened. Pivotally mounted on the pivot 13 is the top bar 17 of the gate. Pivotally mounted on the pivot 18, which connects the braces 15, is a second bar 19. Pivotally mounted on the pivot 14 and connecting the bottom of the posts 11 is the bottom rail 20 of the gate. On each side of the rails 17, 19, and 20 and near the outer end thereof are the adjustable braces 21 and 22. Connecting these braces are the pivots 23, 24, and 25, which extend through the slots 26, 27, and 28 in the bars 17, 19, and 20, respectively. These slots are made in these bars so that the braces 21 and 22 can be adjusted longitudinally of the bars to maintain the wires 29, which form a portion of the gate, and take the place of the bars which are ordinarily used in gates taut. I have provided a sliding block 30 for each of the slots 26, 27, and 28 in the bars 17, 19, and 20, respectively, and have provided screws 31, which are designed to pass through said blocks 30 and through the outer end of each of said bars, so arranged that as the screws are turned in one direction the blocks will be moved toward the outer end of the slots and when turned in the opposite direction they will be moved to the opposite end of the slot. The bar 17 extends rearwardly from the pivot 13 and back of the posts 10.

Attached to the extreme rear upper end of the bar 17 is a weight 32, designed to counterbalance to a certain extent the weight of the gate, so that it will easily be swung from a closed to an open position and from an open to a closed position. Attached to each end of the weight 32 and to the outside of each of the posts 11 is a spring 33, which normally holds the gate at a closed or an open position. When the gate is in its closed position, the springs are substantially in line with the bar 17. As soon as the gate has been raised slightly the rear end of the bar 17, to which the weight 32 is attached, will move downwardly and forwardly. The rear end of the springs 33 will be correspondingly moved, and in consequence of this fact the springs will exert a drawing force and cause the rear end of the bar 17 to be drawn toward the posts 10 and the forward end of the gate to be swung upwardly. These springs will also serve to prevent the gate from swinging too rapidly from an open to a closed position.

Attached to the rear of the posts 10 is a forked arm which is designed to receive between its prongs 34 and 35 that portion of the bar 17 which is at the rear of the posts 10. Forming the lower end of each of the prongs 34 and 35 are the springs 36 and 37. When the gate is in a closed position, the connecting portion 38 of the pronged arms is designed to normally rest on the upper portion of the bar 17 and to enter a notch 39 in the upper portion of said bar and prevent the connecting portion 38 between the prongs 34 and 35 from being moved forwardly beyond said notch as the gate is swung from an open to a closed position. It will be seen that as the gate approaches its lower limit of movement the connecting-piece 38 will engage the upper rear portion of the bar 17, and the springs 36 and 37 in said pronged arm will serve to break the fall of the gate to a great extent as it approaches its closed position.

Attached to the rear portion of the block 16, which connects the posts 10, is a pulley 40, having two wheels therein. Attached to the extreme rear end of the bar 17 and connected with the loop 41, which is at the upper end of the pronged arm, is a rope 42. This rope 42 passes over one of the wheels of the pulley 40 and over a pulley 43, which is attached to a post 44 some distance away from the side of the gate and downwardly from said pulleys, where its lower end can be easily reached by a person in a vehicle which is to pass through the gate. At the lower end of this rope is a small weight 45, which is designed to keep the rope taut. Attached to the rope 42 is a rope 46, which passes over the other wheel of said pulley 40 and over a pulley similar to the pulley 43 on a post similar to the post 44, which is on the opposite side of the gate from said post. This rope 42 also has a weight similar to the weight 45 at its extreme end. It will be seen that by grasping either of the ropes 42 or 46, if the gate is in an open position, the operator can by giving these ropes a slight pull cause the gate to be swung downwardly to a closed position, the pronged arm serving to hold the rope 42 rearwardly, and thus enable the operator to exert a direct pulling force on the rear end of the bar 17, which causes the gate to be moved from an open to a closed position.

Pivotally mounted between the upper ends of the braces 18 is a latch 47, having its free end resting in a notch 48 in the upper surface of the bar 19 of the gate when the gate is in a closed position. This latch serves to positively lock the gate in its closed position on account of its resting in the notch 48. Attached to the central portion of the latch 47 is a rope 49, which extends upwardly on its point of attachment over the pulley 50 and out over a pulley on one of the posts 44. Also attached to the latch is another rope 51, which extends over the pulley 52 and out over a pulley on the other post 44. Each of these ropes 49 and 51 has a weight 53 at its outer end to normally hold said ropes taut while the gate is being operated. As the operator pulls either one of these ropes 49 and 51 the latch will be swung out of the notch 48 and the upper portion of it will rest against the lower portion of the bar 17, which will cause the gate to be swung upwardly when the pulling force on either of the ropes is continued. This will cause the rear end of the bar 17 to be moved downwardly a slight distance and the rear end of the springs 33 to be correspondingly moved, and as soon as the springs pass a dead-center they will exert a pulling force on the rear end of the bar 17 and cause the gate to be swung to an open position. It will be seen that by approaching from either direction the gate can be raised and closed.

Mounted between the posts 10 and near their lower portions is a spring 54, which is designed to engage the rear end of the bar 17 when said bar passes between the posts 10 and prevent the jar and break the momentum of the gate, which is caused by the drawing force of the springs 33, and thus prevent the racking of the gate as it is swung from a closed to an open position.

Mounted outside of the front end of the gate when it is in a closed position are the posts 55 and 56. The post 55 is designed to have the wire or other fence material attached to it. Mounted on each of the posts 55 and 56 is a wire guide 57, which extends vertically of said posts and some distance above each of them. These wires 57 are bent outwardly and away from each other at a point immediately above the posts and extend directly above the posts. As the gate is swung from an open to a closed position the forward end of the gate passes between these wires 57, and if the gate is warped or out of a true line the portions of the wire which are bent will engage the bars of the gate and cause it to be guided between the posts 55 and 56. Near the bottom of the posts each of the wires 57 is bent inwardly at 58 toward the other to form means for breaking the fall of the gate. These bent portions of the wires 57 are designed to engage the bar 20 when the gate is in a closed position and prevent the gate from being moved horizontally. These wires also serve as lightning-rods and extend into the ground some distance to carry off any electricity that may be transmitted to these wires. The wire 57, which is attached to the post 55, is also connected with the wires of the fence of which the post 55 is a part, so that if one of the wires in this fence is struck by lightning the electricity will be carried into the ground by means of the wire 57, to which it is attached.

Attached to the rear of one of the posts 10 and connected with the wire fence adjacent to it is a wire so arranged and constructed that if one of the wires of the fence adjacent to the rear of the gate is struck by lightning the electricity will be carried into the ground by means of this wire, and thus the gate will be protected from electric currents striking the wires, and in consequence the cattle which hover around a gate in a thunder-storm will not be as apt to be killed as if the current were allowed to pass through the gate.

Mounted outside of each of the posts 10 is a fence-post 59, which has the ordinary fencing material attached to it.

Through the entire specification I refer to the back or rear end of the gate as that end upon which the gate swings and the forward end of the gate as that which is away from the pivotal points upon which the gate is mounted.

In practical operation the operator grasps the weight 53 as he approaches the gate and draws it a slight distance downwardly and the gate is swung to an open position. The weight 32 will engage the lower rear portions of the posts 10 and prevent the gate from being swung after it has reached a vertical position. The springs 33 hold the gate in that position. Then after the operator has passed through the gate he grasps the weight 45 and pulls it downwardly, and the gate is swung to a closed position and locked in that position by means of the latch 47.

Having thus described my invention, what I claim, and desire to secure by Letters Patent of the United States therefor, is—

1. In a gate, a series of bars pivotally mounted near the rear ends, means pivotally and slidingly mounted at the front end of said gate for maintaining in position said bars, wires extending longitudinally of the gate and attached at one end to said pivotal and sliding means, and means for maintaining said pivotally and slidingly mounted means relative to the bars of the gate, for the purposes stated.

2. A pivotally-mounted gate, bars and wires extending longitudinally of said gate, a weight at the upper rear end of the uppermost of said bars and behind its pivotal point of attachment, posts mounted on each side of the gate, a spring attached to each of said posts and to each end of said weight for drawing the weight upwardly and rearwardly, a locking mechanism pivotally mounted between said posts and designed to engage the upper portion of one of said bars, means for releasing said locking mechanism from each side of the gate and for starting the gate upwardly and rearwardly, and means for closing the gate, for the purposes stated.

3. In a gate, a series of pivotally-mounted bars, a weight at the rear end of the uppermost of said bars and behind its pivotal point of attachment, springs attached to each end of said weight and to points adjacent to the side of said gate for swinging the gate from a closed to an open position and for maintaining it in that position until released, springing means for breaking the fall of the gate as it moves from an open to a closed position, and means for operating the gate on each side thereof.

4. In a gate, a series of pivotally-mounted bars, a weight at the rear end of the uppermost of said bars and behind its pivotal point of attachment, springs attached to each end of said weight and to points adjacent to the side of said gate for swinging the gate from a closed to an open position and for maintaining it in that position until released, and springing means for stopping the upward rearward movement of the gate as it is moved from a closed to an open position, and means for operating the gate on each side thereof.

5. A pivotally-mounted gate, means for locking the gate in a closed position, ropes attached to said means for releasing the locking mechanism and for swinging the gate upwardly and rearwardly on its pivot, means for limiting the upward movement of the gate and means attached to the rear end of the gate for swinging it from an open to a closed position, and springing means for breaking the fall of the gate as it moves from an open to a closed position.

6. Posts mounted a slight distance apart, a gate pivotally mounted at its rear end between said posts, posts mounted on each side of the front end of the gate when it is in a closed position, wires attached to the inside of each of said posts and bent inwardly toward each other, a slight distance above the ground-surface designed to guide the gate between said posts and to break the fall of it as it swings from an open to a closed position and to prevent it from horizontal movement when in a closed position.

7. In a gate, pivotally-mounted bars, wires extending longitudinally of said gate and forming a part of it, braces pivotally and adjustably mounted on said bars and connected with said wires, and means for adjusting the braces longitudinally of the bars for keeping the wires taut.

8. In a gate the combination of pivotally-mounted bars, a pivotally-mounted latch mounted between two of said bars and designed to engage a notch in one of them to hold the gate in a closed position, ropes attached to said latch for swinging it upwardly on its pivot into engagement with the uppermost of said bars for swinging the bars on their pivots upwardly and rearwardly, springs connected with the rear end of the uppermost of said bars and back of its pivotal point of attachment for drawing the gate to an open position and maintaining it in that position.

9. In a gate, the combination of pivotally-mounted bars, a pivotally-mounted latch mounted between two of said bars and designed to engage a notch in one of them to hold the gate in a closed position, ropes attached to said latch for swinging it upwardly on its pivot for swinging the bars on their pivots upwardly and rearwardly, springs connected with the rear end of the uppermost of said bars and back of its pivotal point of attachment for drawing the gate to an open position and maintaining it in that position, and means for limiting the upward movement of the gate.

10. In a gate, the combination of pivotally-mounted bars, braces connecting the free ends of said bars, a pivotally-mounted latch mounted between two of said bars and designed to engage a notch in one of them to hold the gate in a closed position, ropes attached to said latch for swinging it upwardly on its pivot for swinging the bars on their pivots upwardly and rearwardly, springs connected with the rear end of the uppermost of said bars and back of its pivotal point of attachment for drawing the gate to an open position and maintaining it in that position, a weight mounted at the extreme rear end of the uppermost of said bars for counterbalancing the weight of the gate to a certain extent, and springing means for limiting the upward and rearward movement of the gate.

11. In a gate, the combination of pivotally-mounted bars, braces connecting the upper ends of said bars, a pivotally-mounted latch mounted between two of said bars and designed to engage a notch in one of them to hold the gate in a closed position, ropes attached to said latch for swinging it upwardly on its pivot for swinging the bars on their pivots upwardly and rearwardly, springs connected with the rear end of the uppermost of said bars and back of its pivotal point of attachment for drawing the gate to an open position and maintaining it in that position, a weight mounted at the extreme rear end of the uppermost of said bars for counterbalancing the weight of the gate to a certain extent, and springing means for limiting the upward and rearward movement of the gate, means for swinging the gate from an open to a closed position, and springing means for limiting the downward and forward movement of the gate.

12. In a gate, the combination of pivotally-mounted bars, braces connecting the free ends of said bars, a pivotally-mounted latch mounted between two of said bars and designed to engage a notch in one of them to hold the gate in a closed position, ropes attached to said latch for swinging it upwardly on its pivot for swinging the bars on their pivots upwardly and rearwardly, springs connected with the rear end of the uppermost of said bars and back of its pivotal point of attachment for drawing the gate to an open position and maintaining it in that position, means for limiting the downward forward movement of the gate, and means for swinging the gate from an open to a closed position.

13. In a gate, pivotally-mounted bars, wires extending longitudinally of said bars and between them, braces adjustably mounted on said bars and connected with said wires, for the purposes stated.

14. In a gate, pivotally-mounted bars, wires extending longitudinally of said bars, braces pivotally and adjustably attached to said bars and connected with said wires, and means for adjusting the braces longitudinally of the bars for maintaining the wires in a taut position.

FRANK M. CONROY.

Witnesses:
F. J. TURNER,
H. P. BARRON.